Sept. 8, 1970    B. E. ENSSLE    3,527,478

CONDUIT COUPLING MANIPULATOR

Filed Nov. 18, 1968

INVENTOR.
Bruno E. Enssle
BY

*Glenn B. Morse*

ATTORNEY

3,527,478
CONDUIT COUPLING MANIPULATOR
Bruno E. Enssle, P.O. Box 422, Lander, Wyo. 82520
Filed Nov. 18, 1968, Ser. No. 776,542
Int. Cl. F16l 35/00
U.S. Cl. 285—38                                          3 Claims

ABSTRACT OF THE DISCLOSURE

A semi-permanent manipulator for a component of a conduit coupling fitting, the manipulator being engageable axially over an axial sequence of such fittings and components whether or not they are in rotative alignment, and providing a shield for the operator, a means for aligning fitting components attached to flexible tubing, and menas for axially and rotatively interengaging the components in close quarters.

BACKGROUND OF THE INVENTION

Coupling fittings for pipe and for metallic and plastic tubing are in such widespread use that their configuration has become fairly well standardized. By far the largest proportion of these fittings involves separable components that are in threaded engagement to form an axial sequence. These components commonly will have a fraction of their axial length formed in a hexagonal configuration in cross section for wrench engagement. This portion of the fitting component is usually the portion of largest transverse dimensions, as the fitting is quite commonly turned out of bar stock of the hexagonal cross section on some form of a screw machine. While some of these fittings are also die-cast, the configuration naturally resulting from screw machine manufacture has tended to predominate. The coupling fittings are usually interengaged with a wrench or pliers, and a number of problems immediately arise during the assembly of an axial sequence of these components in close quarters. In the first place, the engagement of a wrench with one of these components inevitably leaves the component free to move with respect to the wrench about an axis perpendicular to the planes of the jaws of the wrench. This inevitably makes it necessary to proceed with a two-handed assembly technique, in which one hand is used to align the component, and the other to manipulate the wrench. The two-handed technique is also necessary whenever it becomes desirable to apply some degree of axial force in the course of the engagement of the fittings, either because of the nature of the fittings themselves, or because of some degree of drag or lateral tension on the conduit to which the components are secured. Since the wrench is normally free to move axially along the component, the second hand becomes necessary in order to proceed with the assembly. Another problem commonly encountered in handling relatively high-pressure fittings, or where gases or liquids are involved that might cause damage on escape, centers in the fact that the hands and clothing of the operator are in the immediate area where the escape is most likely whenever coupling components are interengaged or disengaged. These problems have not been effectively solved by any devices known to applicant, and the present invention provides a complete solution with a remarkable economy.

SUMMARY OF THE INVENTION

The preferred form of the present invention provides a manipulator in the general configuration of a wheel having a central driving aperture engageable axially over the conventional hexagonal wrench portions of standard coupling fittings. This manipulator may be semi-permanently attached to any one of a group of coupling components, so that it may be used not only to rotate the component, but also to apply axial and aligning forces to correct tendencies for misalignment which may be due to the attachment of the component to relatively stiff or displaced tubing. The axial length of the manipulator is such as to permit rotative alignment with each of a series of interconnected coupling components of standard configuration so that the manipulator may be moved axially from one to another and attached to a desired component in a series. Once it has been axially positioned as required, the manipulator is secured in position by the action of a set screw, which is primarily responsible for the transfer of axial forces. When the wheel is thus positioned, it not only functions as a means of applying torque in much closer quarters than would be convenient for the proper application of a wrench, but also functions as a shield protecting the operator against the discharge of fluids that may be accidentally associated with the engagement or disengagement of the coupling components. The periphery of the wheel-shaped manipulator is preferably knurled, which facilitates the one-handed alignment and application of torque that is impossible with a conventional wrench.

DESCRIPTION OF THE DRAWING

The several features of the invention will be analyzed in detail through a discussion of the preferred form of the invention illustrated in the accompanying drawing, in which.

DESCRIPTION OF THE PREFERRED EMBODIMENT

Figure 1:
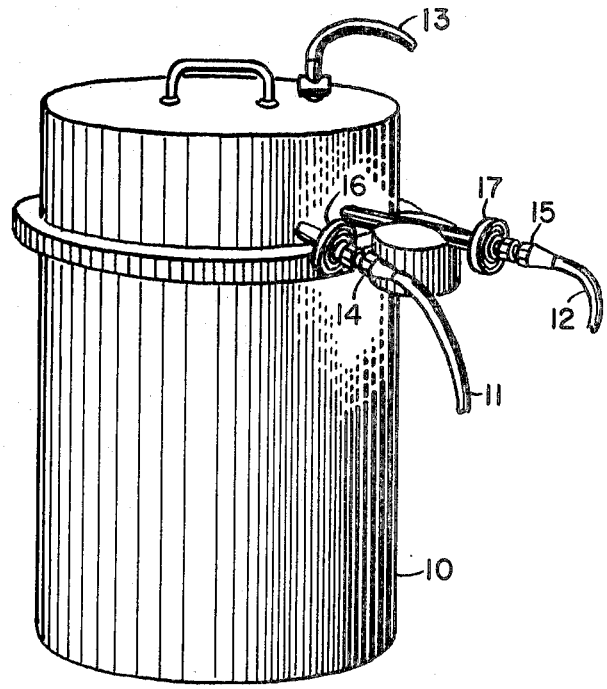
FIG. 1 is a perspective view showing the assembled relationship of a pair of manipulators installed in conjunction with tubing connections entering a container.
Figure 2:
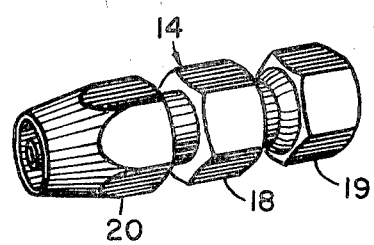
FIG. 2 is a perspective view on an enlarged scale of a standard assembly of coupling fitting components with which the manipulator is engageable.
Figure 3:
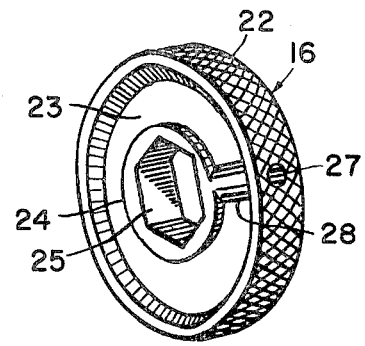
FIG. 3 is a perspective view on approximately the scale of FIG. 2 of the manipulator alone.
Figure 4:
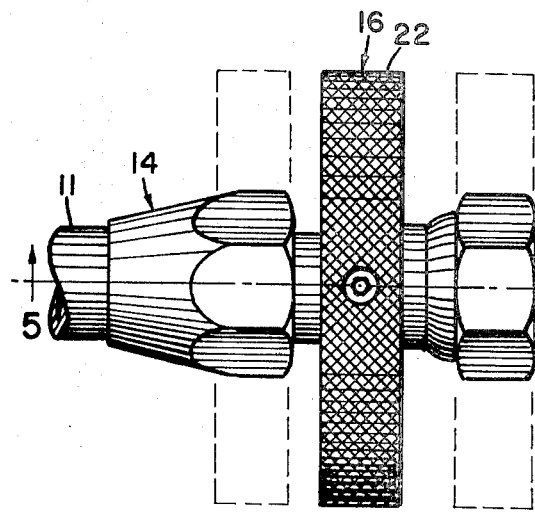
FIG. 4 is a side view showing the manipulator is assembled relationship with a series of coupling components similar to that illustrated in FIG. 2 on an enlarged scale, the dotted lines indicating a sequence of possible positions of the manipulator.

The container 10 shown in FIG. 1 is attached to other equipment (not shown) by the conduits 11, 12, and 13. The conduits 11 and 12 are coupled to the container 10 by the coupling assemblies 14 and 15, respectively. These assemblies are each provided with a wheel-shaped manipulator, as shown at 16 and 17. These two manipulators are identical, and are shown most clearly in FIG. 3. The coupling assemblies 14 and 15 may also be considered as identical, and include a central member having the hexagonal peripheral section indicated at 18, the end member having the hexagonal section 19, and the opposite end member with the hexagonal section 20. The section 19 provides for the application of torque to engage the associated coupling component with the threaded extension 21 of the container 10, and the opposite end section 20 controls a fitting of standard configuration which receives the tube 11. A number of types of clamping interengagement have been developed for securing the tubing 11 with respect to the assembly, but these form no part of the present invention.

Figure 5:
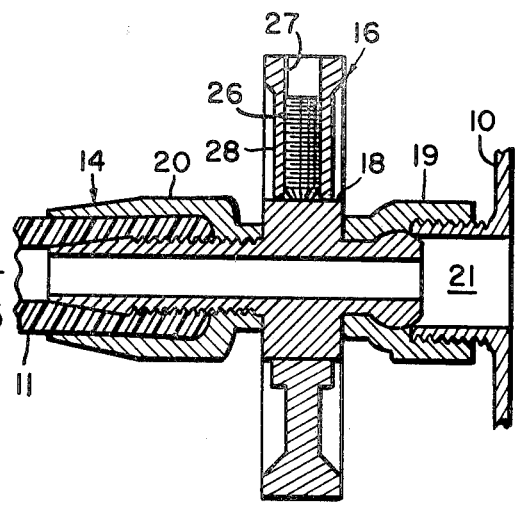
FIG. 5 is a sectional view on the plane 5—5 of FIG. 4.

The manipulator 16 has a knurled periphery 22, and a transverse web 23 interconnecting the peripheral portion with a central hub 24 provided with a hexagonal opening 25 for registry with the hexagonal sections 18, 19 and 20. The axial length of the hub portion 24 containing the opening 25 is selected preferably to be less than the axial space between the hexagonal sections 18 and 19, and 19 and 20. This arrangement makes it possible to slip the manipulator 16 axially into position from either direction, even though the sections 18, 19, and 20 may be out of rotative alignment about their common axis. FIG. 5 illustrates a condition in which the manipulator 16 can be slipped axially to the right to a position where it can be rotated free of engagement with either the sections 18 or 19. The position of the hexagonal section 20 at the opposite end of the assembly is an extreme condition not normally encountered. The generation of an effective clamping action on the tube 11 has caused the section 20 to be positioned farther to the right, as shown in this figure, than is normally encountered. The fitting can easily be backed off to the left, however, if it were to become desirable to transfer the manipulator 16 to the hexagonal section 20. Once the manipulator 16 has been placed wherever it may be desired, it is temporarily secured by the tightening of the set screw 26 engaging the threaded opening 27 disposed within the radially-extending thickened portion 28 in the web 23. When the manipulator engages the section 19 and the set screw 26 is tightened, the manipulator becomes useful as a means of applying torque and for axially aligning the conduit assembly with the axis of the threaded extension 21 so that the coupling procedure can be completed with the use of one hand of the operator. Any tension in the tubing 11 can be effectively controlled in this manner.

I claim:

1. In combination with an axial sequence of rotative coupling fittings, each having a non-circular peripheral portion, said fittings having the entire configuration thereof disposed within the axially projected planes defining said peripheral portion,
a device for manipulating said fitting, comprising:
 a handle having a circumferentially continuous, non-circular central opening adapted to slip axially over said non-circular peripheral portion in rotary driving relationship, the said non-circular portions being normally axially spaced by an amount greater than the axial length of said handle at said central opening; and
 securing means operable to maintain the axial interengagement of said non-circular peripheral portions and said handle.

2. A device as defined in claim 1, wherein said handle is a wheel providing a transverse shield surface.

3. A device as defined in claim 2, wherein said wheel has a web and at least one radially-extending thickened portion thereof, and said securing means is a set screw disposed within said radially-extending portion.

References Cited

UNITED STATES PATENTS

| | | | |
|---|---|---|---|
| 2,381,498 | 8/1945 | Iverson | 285—38 |
| 2,913,258 | 11/1959 | Woodling | 285—31 X |
| 3,175,435 | 3/1965 | Pollack | 81—121 |
| 3,283,621 | 11/1966 | Faso | 81—58.1 |

FOREIGN PATENTS 608,191  4/1926  France.

DAVE W. AROLA, Primary Examiner

U.S. Cl. X.R.

285—404